(12) United States Patent
Bohn (10) Patent No.: US 8,847,888 B2
(45) Date of Patent: Sep. 30, 2014

(54) OPTICAL MOUSE WITH LIMITED WAVELENGTH OPTICS

(75) Inventor: David Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 11/959,449

(22) Filed: Dec. 18, 2007

(65) Prior Publication Data

US 2009/0153486 A1  Jun. 18, 2009

(51) Int. Cl.
- G06F 3/033 (2013.01)
- G06F 3/0354 (2013.01)
- G06F 3/03 (2006.01)

(52) U.S. Cl.
CPC .......... *G06F 3/03543* (2013.01); *G06F 3/0317* (2013.01)
USPC ........................................................ 345/166

(58) Field of Classification Search
CPC ... G06F 3/0304; G06F 3/0317; G06F 3/0325; G06F 3/033; G06F 3/0354; G06F 3/03543; G06F 3/03544; G06F 3/038; G06F 3/0383
USPC ................................................ 345/163–166
See application file for complete search history.

(56) References Cited

U.S. PATENT DOCUMENTS

| | | |
|---|---|---|
| 5,644,129 A | 7/1997 | Hsu et al. |
| 5,664,139 A | 9/1997 | Spurlock |
| 5,703,356 A | 12/1997 | Bidiville et al. |
| 5,825,044 A | 10/1998 | Allen et al. |
| 5,994,710 A | 11/1999 | Knee et al. |
| 6,111,563 A * | 8/2000 | Hines ............................. 345/166 |
| 6,281,882 B1 | 8/2001 | Gordon et al. |

(Continued)

FOREIGN PATENT DOCUMENTS

| | | |
|---|---|---|
| EP | 1503275 A2 | 2/2005 |
| EP | 1712982 A1 | 10/2006 |
| KR | 100399639 B1 | 9/2003 |
| WO | WO0203369 A1 | 1/2002 |

OTHER PUBLICATIONS

"Agilent Technologies Introduces High-Performance, LED-based Optical Mouse Sensor", Nov. 29, 2004, Agilent, 2000-2007, pp. 1-2.

(Continued)

*Primary Examiner* — Joe H Cheng
*Assistant Examiner* — Keith Crawley
(74) *Attorney, Agent, or Firm* — Jeremy Snodgrass; Ramesh Kuchibhatla; Micky Minhas (57) ABSTRACT

Various embodiments of optical mice are disclosed that facilitate off-surface detection while also providing high-contrast images of a tracking surface. In one embodiment, an optical mouse comprises a light source configured to emit light having a wavelength in or near a blue region of a visible light spectrum toward a tracking surface, an image sensor, and an optical band pass filter configured to pass the light having the wavelength in or near the blue region of the visible light spectrum emitted by the light source while filtering red and infrared wavelengths. Further, the mouse also comprises a controller configured to receive image data from the image sensor and to identify a tracking feature in the image data. The band pass filter prevents ambient light in the filtered wavelengths from reaching the image sensor, and thereby facilitates off-surface detection, while the blue color of the incident light and band pass filter provides a high-contrast image for motion tracking.

20 Claims, 5 Drawing Sheets

(56) References Cited

U.S. PATENT DOCUMENTS

| | | |
|---|---|---|
| 6,424,407 B1 | 7/2002 | Kinrot et al. |
| 6,618,038 B1 | 9/2003 | Bohn |
| 6,655,778 B2 | 12/2003 | Arquilevich et al. |
| 6,750,955 B1 | 6/2004 | Feng |
| 6,831,628 B1 * | 12/2004 | Farag et al. ................ 345/157 |
| 6,894,262 B2 * | 5/2005 | Gao et al. ................ 250/208.1 |
| 6,905,187 B2 | 6/2005 | Arquilevich et al. |
| 6,906,699 B1 | 6/2005 | Fåhraeus et al. |
| 7,042,575 B2 | 5/2006 | Carlisle et al. |
| 7,116,427 B2 | 10/2006 | Baney et al. |
| 7,122,781 B2 | 10/2006 | Rotzoll et al. |
| 7,126,586 B2 | 10/2006 | Jianping et al. |
| 7,158,659 B2 | 1/2007 | Baharav et al. |
| 7,161,682 B2 | 1/2007 | Xie et al. |
| 7,189,985 B2 | 3/2007 | Xie et al. |
| 7,190,812 B2 | 3/2007 | Ahn |
| 7,209,502 B2 | 4/2007 | Brosnan |
| 7,214,955 B2 | 5/2007 | Cheong et al. |
| 7,221,356 B2 | 5/2007 | Oliver et al. |
| 7,222,989 B2 | 5/2007 | Zhou |
| 7,358,958 B2 | 4/2008 | Welch et al. |
| 7,429,744 B2 | 9/2008 | Cheong et al. |
| 7,733,329 B2 | 6/2010 | Xie |
| 2002/0080117 A1 | 6/2002 | Son et al. |
| 2002/0093487 A1 * | 7/2002 | Rosenberg ................ 345/166 |
| 2003/0184521 A1 | 10/2003 | Sugita |
| 2004/0135825 A1 * | 7/2004 | Brosnan ................ 345/857 |
| 2005/0024336 A1 * | 2/2005 | Xie et al. ................ 345/166 |
| 2005/0057492 A1 * | 3/2005 | Bathiche et al. ............ 345/156 |
| 2005/0231482 A1 * | 10/2005 | Theytaz et al. ............ 345/166 |
| 2005/0275630 A1 | 12/2005 | Butterworth et al. |
| 2006/0033833 A1 * | 2/2006 | Hurwitz et al. ............ 348/340 |
| 2006/0050058 A1 | 3/2006 | Chu |
| 2006/0091298 A1 * | 5/2006 | Xie et al. ................ 250/221 |
| 2006/0158617 A1 * | 7/2006 | Hu et al. ................ 353/84 |
| 2006/0255152 A1 | 11/2006 | Xie et al. |
| 2006/0256086 A1 | 11/2006 | Xie et al. |
| 2006/0257669 A1 * | 11/2006 | Ritz et al. ................ 428/432 |
| 2006/0262094 A1 | 11/2006 | Chang |
| 2006/0273355 A1 | 12/2006 | Han |
| 2006/0279545 A1 | 12/2006 | Lan et al. |
| 2007/0008286 A1 * | 1/2007 | Theytaz et al. ............ 345/166 |
| 2007/0013661 A1 | 1/2007 | Theytaz et al. |
| 2007/0057166 A1 | 3/2007 | Kuo et al. |
| 2007/0085859 A1 | 4/2007 | Xie |
| 2007/0090279 A1 | 4/2007 | Venkatesh |
| 2007/0093798 A1 * | 4/2007 | DeBenedictis et al. ......... 606/12 |
| 2007/0126700 A1 | 6/2007 | Wright |
| 2007/0138377 A1 | 6/2007 | Zarem |
| 2007/0139381 A1 | 6/2007 | Spurlock et al. |
| 2007/0146327 A1 | 6/2007 | Chang |
| 2007/0152966 A1 | 7/2007 | Krah et al. |
| 2007/0291001 A1 * | 12/2007 | Trisnadi et al. ............ 345/166 |
| 2008/0278445 A1 * | 11/2008 | Sweetser et al. ............ 345/158 |
| 2008/0288205 A1 * | 11/2008 | Teoh et al. ................ 702/150 |
| 2009/0102793 A1 | 4/2009 | Bohn et al. |
| 2009/0153486 A1 | 6/2009 | Bohn |
| 2009/0160772 A1 | 6/2009 | DePue et al. |

OTHER PUBLICATIONS

"Built for the Road: Logitech V400 Laser Cordless Mouse Features Dual Laser, Robust Wireless Technology, Rugged Design", Logitech, 2007, p. 1.

"Introducing the Wireless Mighty Mouse", Viacom International Inc., pp. 1-2.

"Xoxide BlueIce USB Optical Mouse", Xoxide, 2006, pp. 1-2.

"Razer Copperhead 2000 Dpi Tempest Blue Laser Mouse (PC)", 2007, Dark Planets Ltd, pp. 1-2.

"A Laser Mouse from Optorite?", 1998-2007, FS Media, Inc., pp. 1-2.

"Testing grazing-incidence mirrors at nearly normal incidence", 2007, FindArticles™, pp. 1-3.

Ho, et al., "How Direction of Illumination Affects Visually Perceived Surface Roughness", 2006, pp. 634-648.

ISA Korea, International Search Report and Written Opinion of PCT/US2008/079670, Jun. 29, 2009, WIPO, 12 pages.

ISA Korea, International Search Report and Written Opinion of PCT/US2008/083946, Jun. 29, 2009, WIPO, 11 pages.

* cited by examiner

OPTICAL MOUSE WITH LIMITED WAVELENGTH OPTICS

BACKGROUND

An optical computer mouse uses a light source and image sensor to detect mouse movement relative to an underlying tracking surface to allow a user to manipulate a location of a virtual pointer on a computing device display. Two general types of optical mouse architectures are in use today: oblique architectures and specular architectures. Each of these architectures utilizes a light source to direct light onto an underlying tracking surface and an image sensor to acquire an image of the tracking surface. Movement is tracked by acquiring a series of images of the surface and tracking changes in the location(s) of one or more surface features identified in the images via a controller.

Optical mice may be configured to detect an "off-surface condition" when the mouse is lifted off of a tracking surface. The detection of an off-surface condition allows the operation of the mouse to be adjusted in response to being lifted off of the tracking surface. For example, the light source of the mouse may be dimmed or shut off when the mouse is lifted off of the tracking surface to preserve battery life. Furthermore, the tracking of motion also may be suspended until the mouse is again placed on the surface. However, ambient light may affect off-surface detection, and therefore may affect mouse performance.

SUMMARY

Accordingly, various embodiments of optical mice are disclosed herein that facilitate off-surface detection while also providing high-contrast images of a tracking surface. For example, in one embodiment, an optical mouse comprises a light source configured to emit light having a wavelength in or near a blue region of a visible light spectrum toward a tracking surface, an image sensor, and an optical band pass filter configured to pass the light having the wavelength in or near the blue region of the visible light spectrum emitted by the light source while filtering red and infrared wavelengths. Further, the mouse also comprises a controller configured to receive image data from the image sensor and to identify a tracking feature in the image data. The band pass filter prevents ambient light in the filtered wavelengths from reaching the image sensor, and thereby facilitates off-surface detection, while the blue color of the band pass filter provides a high-contrast image for motion tracking.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
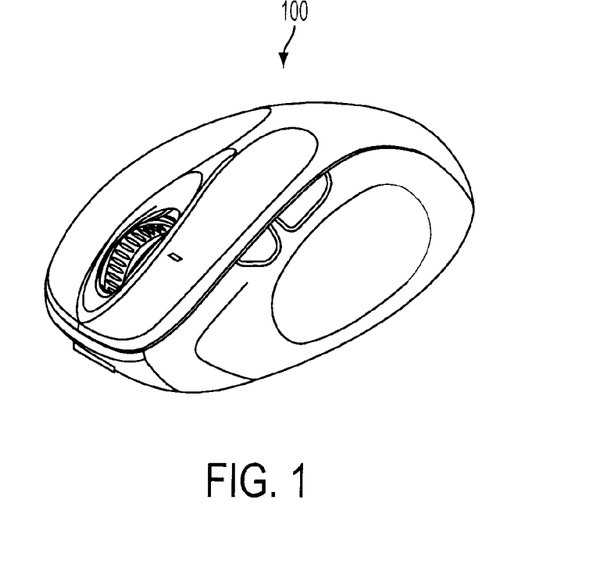
FIG. 1 shows an embodiment of an optical mouse.
Figure 2:
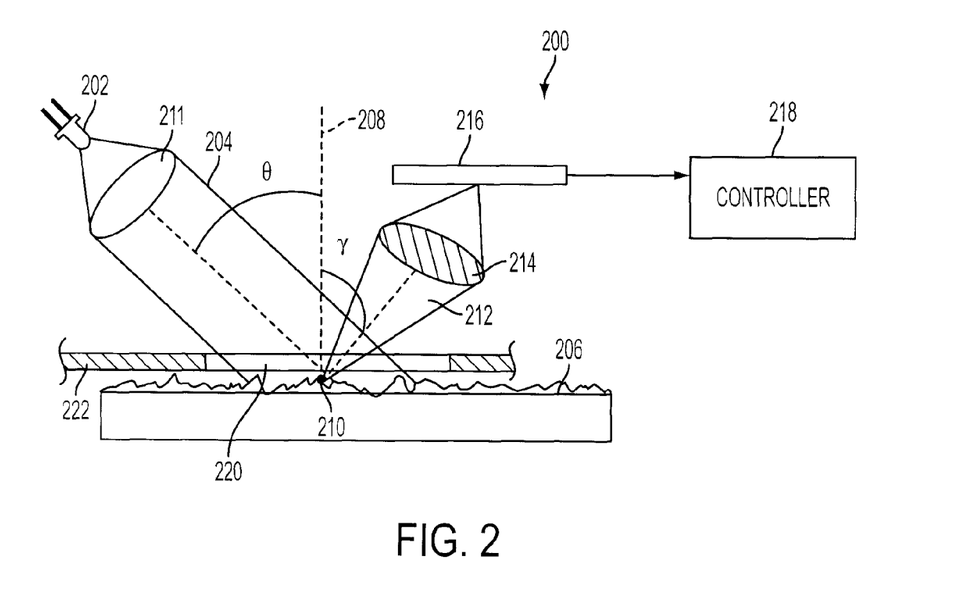
FIG. 2 shows an embodiment of a specular optical architecture for an optical mouse.
Figure 3:
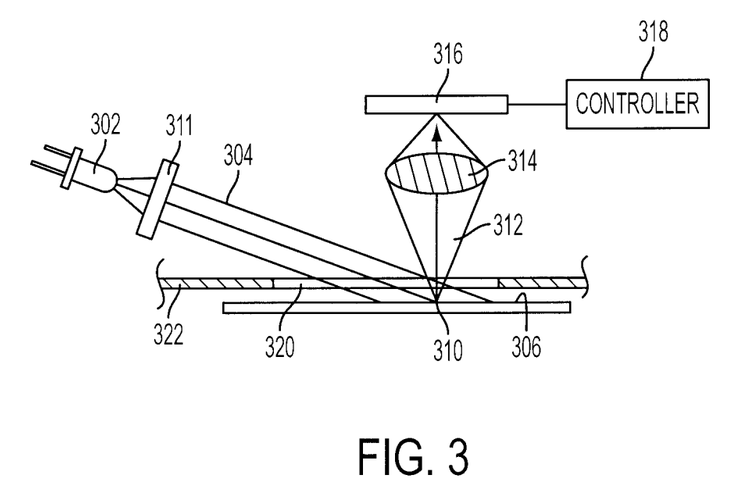
FIG. 3 shows an embodiment of an oblique optical architecture for an optical mouse.

FIG. 1 shows an embodiment of an optical mouse 100, and FIGS. 2 and 3 illustrate embodiments of example optical architectures for the optical mouse 100. First referring to FIG. 2, the optical architecture 200 comprises a light source 202 configured to emit a beam of light 204 toward a tracking surface 206 such that the beam of light 204 is incident upon the tracking surface at a location 210. The beam of light 204 has an incident angle $\theta$ with respect to the normal 208 of the tracking surface 206. The optical architecture 200 may further comprise a collimating lens 211 disposed between the light source 202 and the tracking surface 206 for collimating the beam of light 204. Some portion of the incident beam of light 204 reflects from the tracking surface 206, as indicated at 212, in a distribution about a specular reflection angle $\gamma$, which equals the incident angle $\theta$. Some of this reflected light 212 is then imaged by a lens 214 onto an image sensor 216.

The embodiment of FIG. 2 has a specular optical configuration in that the image sensor 216 is positioned at a specular or near-specular angle. In contrast, the embodiment of FIG. 3 has an oblique optical architecture 300. Light 304 from a light source 302 is emitted toward a tracking surface 306 at an oblique incident angle $\theta$ with respect to a plane of the tracking surface 306 such that it is incident on the tracking surface at a location 310. The optical architecture 300 may further comprise a collimating lens 311 disposed between the light source 302 and the tracking surface 306 for collimating the beam of light 304. Some portion of the incident beam of light 304 reflects from the tracking surface 306, as indicated at 312, in a non-specular direction relative to the incident beam of light 304. This non-specular reflected light is imaged by a lens 314 onto an image sensor 316.

A specular mouse and an oblique mouse may use different features to track motion. For example, a specular mouse may use patches of light specularly reflection from a surface as tracking features. In contrast, an obliquely-arranged detector may be used to detect shadows, rather than patches of reflection, as tracking features.

The light sources 202, 302 are configured to emit light in or near a blue region of the visible spectrum. The terms "in or near a blue region of the visible spectrum", as well as "blue", "blue light" and the like, as used herein describe light comprising one or more emission lines or bands in or near a blue region of a visible light spectrum, for example, in a range of 400-490 nm. These terms may also describe light within the near-UV to near-green range that is able to activate or otherwise enjoy the advantage of optical brighteners sensitive to blue light, as described in more detail below. The light source for each of architectures 200, 300 may be configured to output incoherent light or coherent light, and may utilize one or more lasers, LEDs, OLEDs (organic light emitting devices), narrow bandwidth LEDs, or any other suitable light emitting device. Further, the light source may be configured to emit light that is blue in appearance, or may be configured to emit light that has an appearance other than blue to an observer. For example, white LED light sources may utilize a blue LED die (comprising InGaN, for example) either in combination with LEDs of other colors, in combination with a scintillator or phosphor such as cerium-doped yttrium aluminum garnet, or in combination with other structures that emit other wavelengths of light, to produce light that appears white to a user. In yet another embodiment, the light source comprises a generic broadband source in combination with a band pass filter that passes blue light. Such LEDs fall within the meaning of "blue light" as used herein due to the presence of blue wavelengths in the light emitted from these structures.

Continuing with FIGS. 2 and 3, the image sensors 216, 316 are each configured to provide image data to a controller, shown at 218 and 318, respectively. Where the discussion below is in the context of the embodiment of FIG. 2, it will be understood that the discussion is also applicable to the embodiment of FIG. 3. Continuing, the controller 218 is configured to acquire a plurality of time-sequenced frames of image data from the image sensor 216, to process the image data to locate one or more tracking features in the plurality of time-sequenced images of the tracking surface 206, and to track changes in the location(s) of the plurality of time-sequenced images of the tracking surfaces to track motion of the optical mouse 100. The locating and tracking of surface features may be performed in any suitable manner, and is not described in further detail herein.

The embodiments of FIGS. 2 and 3 each comprise an optical band pass filter configured to filter light other than the wavelengths emitted by the light sources 202, 302. Generally, the band pass filter is disposed optically between the tracking surface and the image sensor so that ambient light (i.e. light from sources other than the light sources 202, 302) of the filtered wavelengths does not reach the image sensor. This may help to improve off-surface detection, as described below.

The band pass filter may be located in any suitable position in architectures 200, 300. For example, the band pass filter may comprise a window 220, 320 disposed on a bottom side 222, 322 of a mouse. The depicted windows 220, 320 may be made of a material, such as a colored plastic (blue, violet, etc.), glass, etc., that passes the wavelength or color of light output by the light sources 202, 302 and that blocks other wavelengths or colors. This may help to reduce the amount of ambient light that reaches the image sensor, and therefore may help to improve off-surface detection, as described below. Alternatively or additionally, the band pass filters may be provided in other locations or in multiple locations. For example, the band pass filters may be implemented as coatings on lenses 214, 314, on the surface of the image sensors 216, 316, and/or as a separate optical element disposed elsewhere between the tracking surfaces 206, 306 and the image sensors 216, 316.

The use of a light source that emits light in or near a blue region of the visible spectrum in combination with an optical band pass filter that passes light in this region while filtering other wavelengths (such as red and infrared wavelengths) may offer unexpected advantages over red and infrared light sources that are commonly used in LED and laser mice. These advantages may not have been appreciated due to other factors that may have led to the selection of red and infrared light sources over blue light sources. For example, currently available blue light sources may have higher rates of power consumption and higher costs than currently available red and infrared light sources, thereby leading away from the choice of blue light sources as a light source in an optical mouse. However, blue light offers various advantages, such as better contrast, higher reflective intensity, lower penetration depth, etc., compared to light of longer wavelengths. The filtering of red, infrared and other longer wavelengths of light from the light reaching the image sensor may further contribute to these effects.

Figure 4:
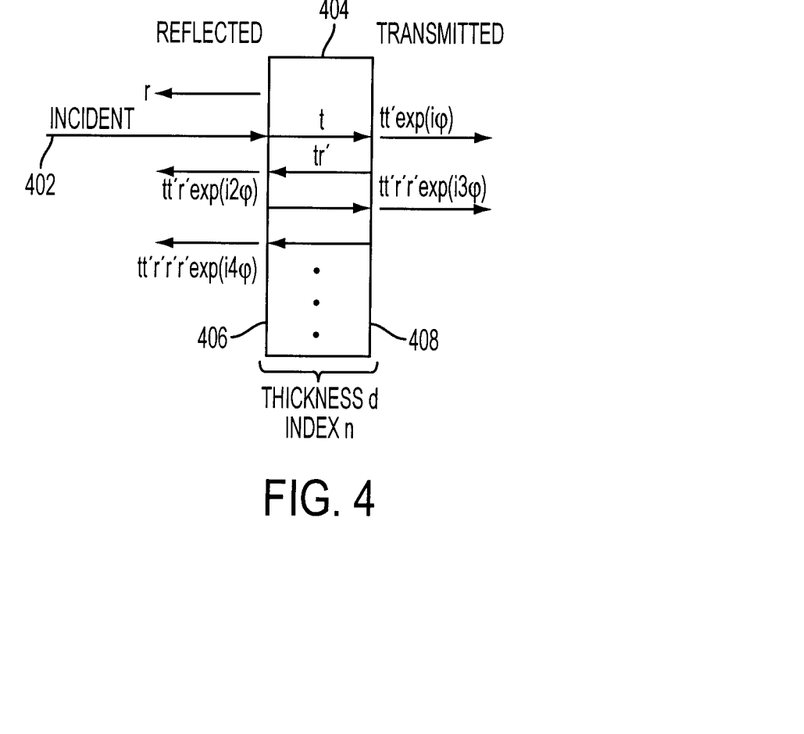
FIG. 4 shows a schematic diagram illustrating the reflection and transmission of light incident on a transparent dielectric slab.

The advantages offered by blue light as defined herein arise at least partly from the nature of the physical interaction of blue light with reflective surfaces compared with red or infrared light. For example, blue light has a higher intensity of reflection from dielectric surfaces than red and infrared light. FIG. 4 illustrates the reflection of an incident beam of light 402 from a dielectric slab 404 made of a material transparent to visible light, having a thickness d, and having a refractive index n. As illustrated, a portion of the incident beam of light 402 is reflected off a front face 406 of the slab, and a portion of the light is transmitted through the interior of the slab 404. The transmitted light encounters the back face 408 of the slab, where a portion of the light is transmitted through the back face 408 and a portion is reflected back toward the front face 406. Light incident on the front face is again partially reflected and partially transmitted, and so on.

The light in the beam of incident light 402 has a vacuum wavelength $\lambda$. The reflection coefficient or amplitude, as indicated by r, and the transmission coefficient or amplitude, as indicated by t, at the front face 406 of the slab 404 are as follows:

$$r = \frac{(1-n)}{(1+n)} \quad t = \frac{2}{(1+n)}$$

At the back face 408 of the slab, the corresponding reflection coefficient, as indicated by r', and the transmission coefficient, as indicated by t', are as follows:

$$r' = \frac{(1-n)}{(1+n)} \quad t' = \frac{2n}{(1+n)}$$

Note that the reflection and transmission coefficients or amplitudes depend only upon the index of refraction of the slab 404. When the incident beam of light strikes the surface at an angle with respect to the surface normal, the amplitude equations are also functions of angle, according to the Fresnel Equations.

A phase shift $\phi$ induced by the index of refraction of the slab 404 being different from the air surrounding the slab 304 is provided as follows:

$$\varphi = \frac{2\pi n d}{\lambda}$$

Taking into account the transmission phase shift and summing the amplitudes of all the partial reflections and transmissions yields the following expressions for the total reflection and transmission coefficients or amplitudes of the slab:

$$R = r + tt'r'\exp(i2\varphi)\sum_{m=0}^{\infty}[r'\exp(i\varphi)]^{2m}$$
$$= r + \frac{r'tt'\exp(i2\varphi)}{1 - r'^2\exp(i2\varphi)}$$

$$T = tt'\exp(i\varphi)\sum_{m=0}^{\infty}[r'\exp(i\varphi)]^{2m}$$
$$= \frac{tt'\exp(i2\varphi)}{1 - r'^2\exp(i2\varphi)}$$

At the limit of a small slab thickness d, the reflected amplitude equation reduces to a simpler form:

$$R \approx i\pi d \frac{n^2 - 1}{\lambda} \exp\left[\frac{i\pi(n^2 + 1)d}{\lambda}\right]$$

At this limit, the reflected light field leads the incident light field by 90 degrees in phase and its amplitude is proportional to both $1/\lambda$ and the dielectric's polarizability coefficient ($n^2-1$). The $1/\lambda$ dependence of the scattering amplitude represents that the intensity of the reflected light from a thin dielectric slab is proportional to $1/\lambda^2$, as the intensity of reflected light is proportional to the square of the amplitude. Thus, the intensity of reflected light is higher for shorter wavelengths than for longer wavelengths of light.

Figure 5:
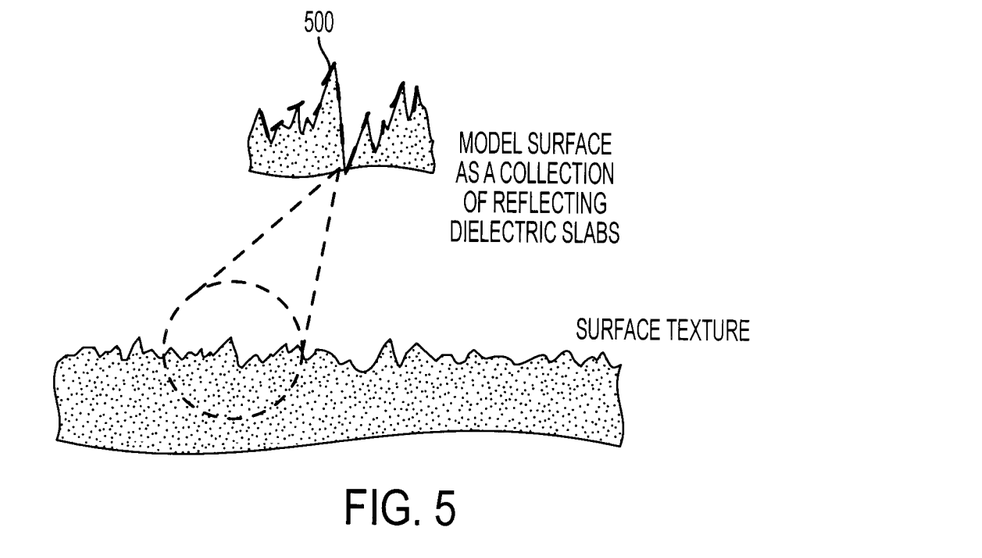
FIG. 5 shows a schematic model of a tracking surface as a collection of dielectric slabs.

From the standpoint of an optical mouse, referring to FIG. 5, and as described above with reference to FIG. 4, the tracking surface may be modeled as comprising a large number of reflective elements in the form of dielectric slabs 500, each oriented according to the local height and slope of the surface. Each of these dielectric slabs reflect incident light; sometimes the reflected light is within the numerical aperture of the imaging lens and is therefore captured by the lens, and other times the light is not captured by the lens, leading to a dark tracking feature at the detector. Operation in the blue at 470 nm leads to an enhancement of the intensity of reflected light in the bright features by an amount of $850^2/470^2 \approx 3.3$ over infrared light having a wavelength of 850 nm, and a factor of $630^2/470^2 \approx 1.8$ over red light having a wavelength of 630 nm. This leads to a contrast improvement in the blue light images at the detector, because bright features on the detector are brighter than they appear in corresponding red or infrared images. These higher contrast images enable the acceptable identification and more robust tracking of tracking features with lower light source intensities, and therefore may improve the tracking performance relative to infrared or red light mice, while also reducing the power consumption and increasing battery life.

Figure 6:
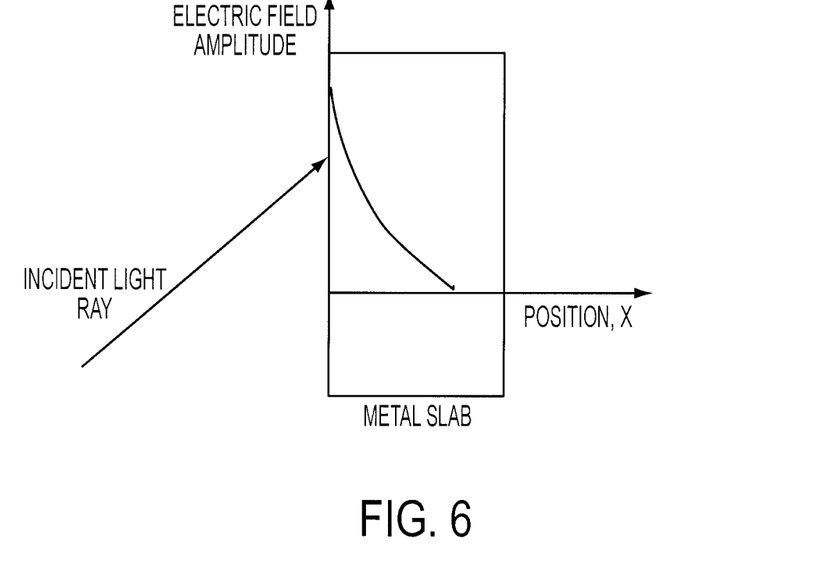
FIG. 6 illustrates a penetration depth of beam of light incident on a metal surface.

FIG. 6 illustrates another advantage of the use of blue light over red or infrared light in an optical mouse, in that the penetration depth of blue light is less than that of red or infrared light. Generally, the electric field of radiation incident on a surface penetrates the surface to an extent. FIG. 6 shows a simple illustration of the amplitude of an electric field within a metal slab as a function of depth. As illustrated, the electric field of the incident beam of light decays exponentially into the metal with a characteristic e-fold distance that is proportional to the wavelength. Given this wavelength dependency, infrared light may extend a factor of 1.8 times farther than blue light into a metal material. Short penetration depths also occur when blue light is incident upon non-metal, dielectric surfaces, as well; the exact penetration depth depends upon the material properties.

The lesser penetration depth of blue light compared to red and infrared light may be advantageous from the standpoint of optical navigation applications for several reasons. First, the image correlation methods used by the controller to follow tracking features may require images that are in one-to-one correspondence with the underlying navigation surface. Reflected light from different depths inside the surface can confuse the correlation calculation. Further, light that leaks into the material results in less reflected light reaching the image detector.

Additionally, the lesser penetration depth of blue light is desirable as it may lead to less crosstalk between adjacent and near-neighbor pixels and higher modulation transfer function (MTF) at the image sensor. To understand these effects, consider the difference between a long wavelength infrared photon and a short wavelength blue photon incident upon a silicon CMOS detector. The absorption of a photon in a semiconductor is wavelength dependent. The absorption is high for short wavelength light, but decreases for long wavelengths as the band-gap energy is approached. With less absorption, long wavelength photons travel farther within the semiconductor, and the corresponding electric charge generated inside the material must travel farther to be collected than the corresponding charge produced by the short wavelength blue photon. With the larger travel distance, charge carriers from the long wavelength light are able to diffuse and spread-out within the material more than the blue photons. Thus, charge generated within one pixel may induce a spurious signal in a neighboring pixel, resulting in crosstalk and an MTF reduction in the electro-optical system.

As yet another advantage to the use of blue light over other light sources, blue light is able to resolve smaller tracking features than infrared or red light. Generally, the smallest feature an optical imaging system is capable of resolving is limited by diffraction. Rayleigh's criteria states that the size d of a surface feature that can be distinguished from an adjacent object of the same size is given by the relationship $$d \geq \frac{\lambda}{NA},$$

where $\lambda$ is the wavelength of the incident light and NA is the numerical aperture of the imaging system. The proportionality between d and $\lambda$ indicates that smaller surface features are resolvable with blue light than with light of longer wavelengths. For example, a blue mouse operating at $\lambda=470$ nm with f/1 optics can image features down to a size of approximately $2\lambda \approx 940$ nm. For an infrared VCSEL (vertical-cavity surface-emitting laser) operating at 850 nm, the minimum feature size that may be imaged increases to 1.7 μm. Therefore, the use of blue light may permit smaller tracking features to be imaged with appropriate image sensors and optical components.

Figure 7:
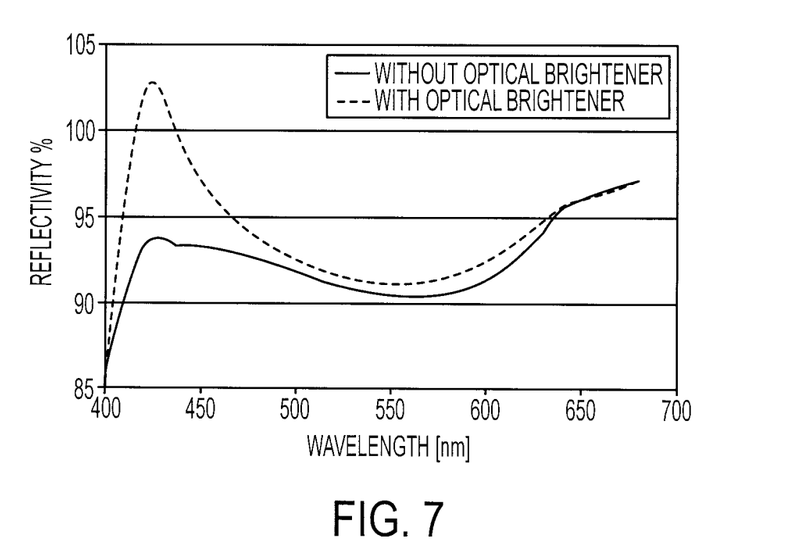
FIG. 7 shows a graph of a comparison of a reflectivity of white paper with and without optical brightener.

Blue light may also have a higher reflectivity than other wavelengths of light on various specific surfaces. For example, FIG. 7 shows a graph of the reflectivity of white paper with and without optical brightener across the visible spectrum. An "optical brightener" is a fluorescent dye that is added to many types of paper to make the paper appear white and "clean". FIG. 7 shows that white paper with an optical brightener reflects relatively more in and near a blue region of a visible light spectrum than in other some other regions of the spectrum. Therefore, using light in or near a blue region of a visible light spectrum as a mouse light source may lead to synergistic effects when used on surfaces that include optical brighteners, as well as other such fluorescent or reflectively-enhanced tracking surfaces, thereby improving mouse performance on such surfaces to an even greater degree than on other surfaces.

Such effects may offer advantages in various use scenarios. For example, a common use environment for a portable mouse is a conference room. Many conference room tables are made of glass, which is generally a poor surface for optical mouse performance. To improve mouse performance on transparent surfaces such as glass, users may place a sheet of paper over the transparent surface for use as a makeshift mouse pad. Therefore, where the paper comprises an optical brightener, synergistic effects in mouse performance may be realized compared to the use of other surfaces, allowing for reduced power consumption and therefore better battery life for a battery operated mouse.

Similar synergistic effects in performance may be achieved by treating or preparing other surfaces to have brightness-enhancing properties, such as greater reflectivity, fluorescent or phosphorescent emission, etc., when exposed to light in or near a blue portion of the visible spectrum. For example, a mouse pad or other dedicated surface for mouse tracking use may comprise a brightness enhancer such as a material with high reflectivity in the blue range, and/or a material that absorbs incident light and fluoresces or phosphoresces in the blue range. When used with a blue light mouse, such a material may provide greater contrast than surfaces without such a reflective or fluorescent surface, and thereby may lead to good tracking performance, low power consumption, etc.

In the case of an oblique laser mouse, the use of blue coherent light may offer advantages over the use of red or infrared coherent light regarding speckle size. Because the speckle size is proportional to the wavelength, blue coherent light generates smaller speckles than either a red or infrared laser light source. In some laser mice embodiments it is desirable to have the smallest possible speckle, as speckle may be a deleterious noise source and may degrade tracking performance. A blue laser has relatively small speckle size, and hence more blue speckles will occupy the area of a given pixel than with a red or infrared laser. This may facilitate averaging away the speckle noise in the images, resulting in better tracking.

The shorter wavelength and coherence length of blue light may offer other advantages as well. For example, a laser mouse utilizing blue light may be less sensitive to dust, molding defects in the system optics, and other such causes of fixed interference patterns than a laser mouse utilizing red light. For example, in the case of a 10 μm dust particle located on the collimating lens of a laser mouse, as the coherent laser light diffracts around the dust particle, circular rings of high contrast appear at the detector. The presence of these rings (and other such interference patterns) may cause problems in the tracking of a laser mouse, as a fixed pattern with high contrast that is presented to the detector creates an additional stationary peak in the correlation function. For a similar reason, the manufacturing of laser mice often requires tight process control on the quality of the injection molded plastic optics, as defects in the plastic may create deleterious fixed patterns in the image stream.

The use of blue light may help to reduce or avoid such problems with fixed patterns. When coherent light strikes a small particle such as a dust particle (wherein "small" in this instance indicates a wavelength roughly the size of the wavelength of light), the light diffracts around the particle and creates a ring-shaped interference pattern. The diameter of the center ring is given by the following relationship:

Diameter=2.44($\lambda$)($f/\#$)

Therefore, according to this relationship, blue light will cause a smaller ring than red or infrared light, and the image sensor will see a smaller fixed-pattern noise source. Generally, the larger the fixed-pattern the detector sees and the more detector pixels that are temporarily unchanging, the worse the navigation becomes as the correlation calculation may become dominated by non-moving image features. Further, with blue incoherent light, the distances over which diffraction effects are noticeable are even shorter than for coherent light or red incoherent light.

In light of the physical properties described above, the use of blue light may offer various advantages over the use of red light or infrared light in an optical mouse. For example, the higher reflectivity and lower penetration depth of blue light compared to red or infrared light may allow for the use of a lower intensity light source, thereby potentially increasing battery life. This may be particularly advantageous when operating a mouse on white paper with an added brightness enhancer, as the intensity of fluorescence of the brightness enhancer may be strong in the blue region of the visible spectrum. Furthermore, the shorter coherence length and smaller diffraction limit of blue light compared to red light from an optically equivalent (i.e. lenses, f-number, image sensor, etc.) light source may allow both longer image feature correlation lengths and finer surface features to be resolved, and therefore may allow a blue-light mouse to be used on a wider variety of surfaces. Examples of surfaces that may be used as tracking surfaces for a blue optical mouse include, but are not limited to, paper surfaces, fabric surfaces, ceramic, marble, wood, metal, granite, tile, stainless steel, and carpets including Berber and deep shag.

Further, in some embodiments, an image sensor, such as a CMOS sensor, specifically configured to have a high sensitivity (i.e. quantum yield) in the blue region of the visible spectrum may be used in combination with a blue light source. This may allow for the use of even lower-power light sources, and therefore may help to further increase battery life.

As mentioned above, the use of an optical band pass filter to pass the wavelengths of light emitted by the light source while blocking other wavelengths of light may facilitate the detection of an off-surface condition. Generally, a mouse may determine that it has been lifted from a tracking surface by an amount of light incident on the image sensor. When lifted from the tracking surface, light from the mouse light source is not reflected toward the image sensor by the tracking surface, thereby causing a decrease in the amount of light that reaches the image sensor. However, ambient light that reaches the image sensor may affect the ability of the mouse to determine an off-surface condition. By using an optical band-pass filter, ambient light outside of the band pass wavelengths is filtered, and therefore does not reach the image sensor. This may greatly limit the amount of ambient light that reaches the image sensor, and therefore facilitate off-surface detection. Further, where the band pass filter passes blue wavelengths, the advantages of blue light described above may be enhanced by filtering non-blue wavelengths.

Figure 8:
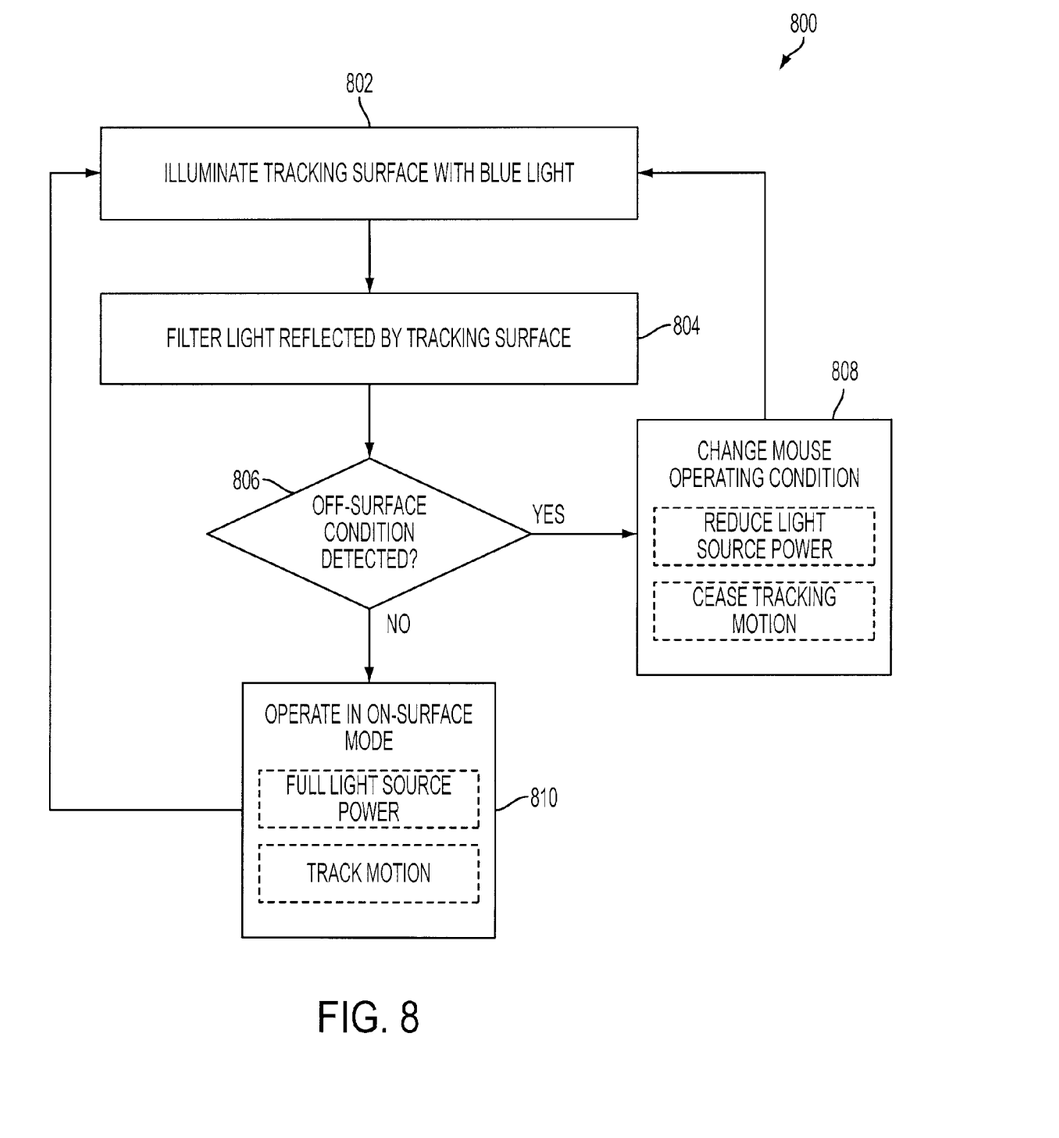
FIG. 8 shows a process flow depicting a method of detecting an off-surface condition in an optical mouse.

FIG. 8 shows a process flow depicting an embodiment of a method 800 for determining an off-surface condition for an optical mouse. First, method 800 comprises, at 802, illuminating a tracking surface with light having a wavelength in or near a blue region of the visible light spectrum, as described above. Next, at 804, method 800 comprises filtering light reflected by the tracking surface toward the image surface to block red and infrared wavelengths of light while passing light of the wavelength output by the light source.

Method 800 next comprises, at 806, detecting an off-surface condition based upon a reduction in an amount of light that reaches the image sensor. The off-surface condition may be detected based upon any suitable measure of a reduction in an amount of light that reaches the image sensor. For example, an off-surface condition may be determined when the total light intensity on the image sensor drops a preselected percentage, or when it falls below a preselected threshold.

Continuing with FIG. 8, upon detecting an off-surface condition, method 800 next comprises, at 808, modifying an operating condition of the mouse upon detecting the off-surface condition. Any suitable modification to the operating condition of the mouse may be made. For example, the mouse may be switched to a low-power mode upon detecting an off-surface condition. This may include reducing power to the light source, and/or any other steps that help to reduce power consumption during the off-surface condition. Likewise, modifying an operating condition of the mouse may comprise ceasing the tracking of motion with the mouse. This may prevent ambient light reaching the image sensor from being interpreted as mouse motion. Operation continues in the modified operating condition until the end of the off-surface condition is detected. Upon detecting the end of the off-surface condition, the mouse may return to its original operating mode, as indicated at 810. This may comprise resuming the tracking motion of the mouse, operating the light source at a full or normal power level, and/or operating the mouse in any other suitable manner.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical mouse, comprising:
   a body having a bottom surface comprising a location at which light can pass through;
   a light source configured to emit light having a wavelength within a range of 400-490 nm toward a tracking surface;
   an image sensor configured to receive light passing through the bottom surface at the location configured to pass light;
   an optical band pass filter disposed optically between the tracking surface and the image sensor and configured to pass the light having the wavelength within the range of 400-490 nm emitted by the light source and exclude wavelengths from outside of the range of 400-490 nm such that all ambient light and all reflected light from the light source that passes through the bottom surface of the mouse to the image sensor is filtered by the band pass filter; and
   a controller configured to receive image data from the image sensor and to identify a tracking feature in the image data.

2. The optical mouse of claim 1, wherein the controller is configured to detect an off-surface condition based upon an amount of light reaching the image sensor.

3. The optical mouse of claim 1, wherein the band pass filter comprises a window positioned in an opening of the bottom surface of the mouse.

4. The optical mouse of claim 1, wherein the band pass filter comprises one or more of a coating on a lens disposed optically between the tracking surface and the image sensor and a coating on the image sensor.

5. The optical mouse of claim 1, wherein the optical mouse has a specular architecture.

6. The optical mouse of claim 1, wherein the optical mouse has an oblique architecture.

7. The optical mouse of claim 1, wherein the light source is configured to emit white light.

8. The optical mouse of claim 1, wherein the light source is configured to emit blue light.

9. The optical mouse of claim 1, wherein the image sensor is configured to have a higher quantum yield in the range of 400-490 nm than outside of the range of 400-490 nm.

10. An optical mouse, comprising:
    a body having a bottom surface comprising a location configured to pass light;
    a light source configured to emit light having a wavelength within a range of 400-490 nm toward a tracking surface;
    a collimating lens disposed between the light source and the tracking surface to collimate light within the range of 400-490 nm from the light source;
    an image sensor;
    an optical band pass filter disposed optically between the tracking surface and the image sensor and configured to pass light within the range of 400-490 nm and exclude wavelengths from outside of the range of 400-490 nm such that all ambient light and all reflected light from the light source that passes through the bottom surface of the mouse to all areas of the image sensor is filtered by the band pass filter; and
    a controller configured to detect an off-tracking-surface condition of the mouse based upon an amount of light that reaches the image sensor.

11. The optical mouse of claim 10, wherein the mouse has a specular optical architecture.

12. The optical mouse of claim 10, wherein the mouse has an oblique optical architecture.

13. The optical mouse of claim 10, wherein the band pass filter comprises a window that forms a portion of the bottom surface of the mouse at the location configured to pass light.

14. The optical mouse of claim 10, wherein the band pass filter comprises one or more of a coating on a lens disposed optically between the tracking surface and the image sensor and a coating on the image sensor.

15. The optical mouse of claim 10, wherein the image sensor is configured to have a higher quantum yield in the range of 400-490 nm than outside of the range of 400-490 nm.

16. In an optical mouse comprising a light source and an image sensor, a method of operating the mouse, comprising:
    illuminating a tracking surface with light from the light source having a wavelength within a range of 400-490 nm;
    passing light reflected by the tracking surface toward the image sensor through a location in a bottom surface of the mouse;
    filtering light to block light outside the range of 400-490 nm while passing the light having the wavelength within the range of 400-490 nm emitted by the light source such that all ambient light and all reflected light from the light source that passes through the bottom surface of the mouse to all areas of the image sensor is filtered by a band pass filter;
    detecting an off-surface condition based upon a total light intensity on the image sensor dropping below a preselected threshold; and
    changing an operating condition of the mouse upon detecting the off-surface condition.

17. The method of claim 16, wherein changing an operating condition of the mouse comprises switching the mouse to a low-power mode.

18. The method of claim 16, wherein changing an operating condition of the mouse comprises ceasing a tracking of motion of the mouse.

19. The method of claim 18, further comprising detecting an on-surface condition and then resuming tracking of motion of the mouse.

20. The method of claim 16, wherein the image sensor is configured to have a higher quantum yield in the range of 400-490 nm than outside of the range of 400-490 nm.

* * * * *